Dec. 29, 1936.　　　W. R. LYMAN　　　2,065,594
CIRCUIT CONTROL APPARATUS
Filed Feb. 20, 1936
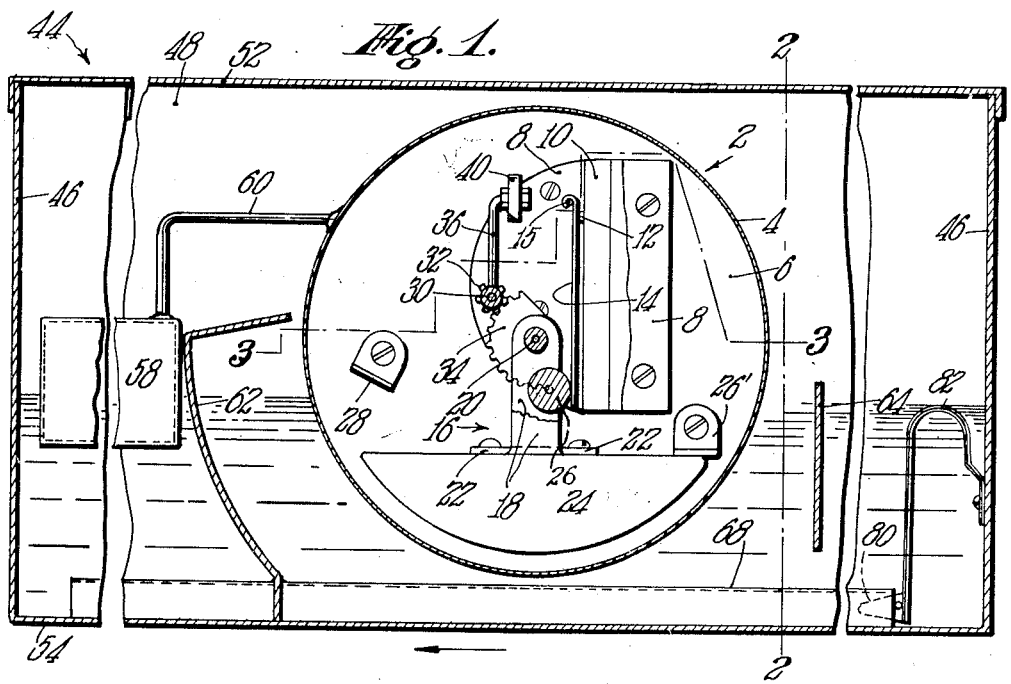
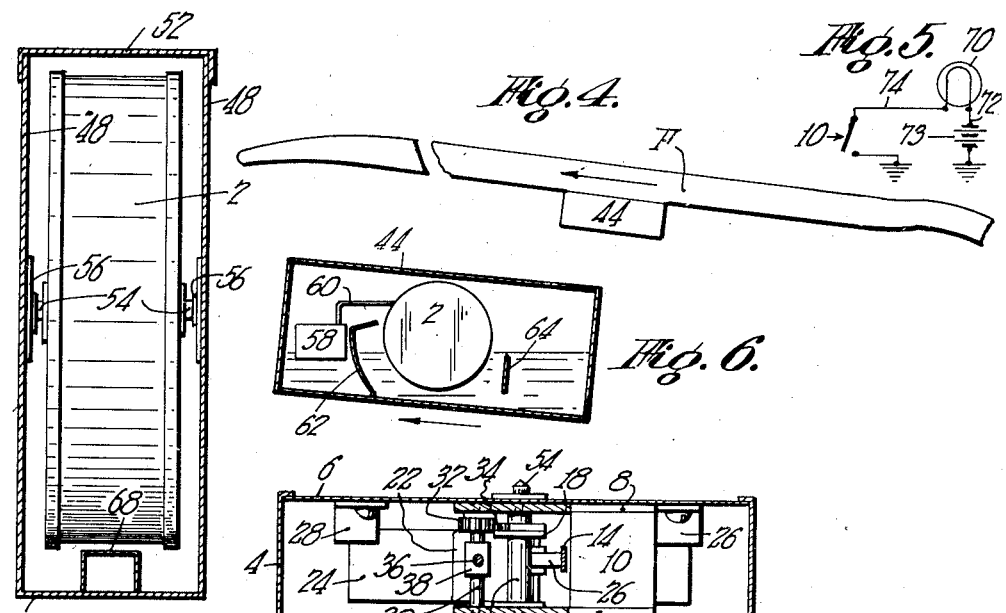
INVENTOR.
BY Wallace R. Lyman
ATTORNEY.

Patented Dec. 29, 1936

2,065,594

UNITED STATES PATENT OFFICE 2,065,594

CIRCUIT CONTROL APPARATUS

Wallace R. Lyman, Springfield, Mass.

Application February 20, 1936, Serial No. 64,879

6 Claims. (Cl. 200—52)

This invention relates to improvements in circuit control apparatus and is directed more particularly to improvements in switch apparatus adapted to automatically open and close a circuit.

The principal objects of the invention are the provision of a circuit control apparatus adapted for use in connection with a vehicle or the like which is constructed and arranged to operate according to the movement of the vehicle. For instance the apparatus may control a circuit including a stop light so that as the vehicle speed slackens or decreases, the stop light is caused thereby to be energized.

Heretofore the stop light of a vehicle is energized by the operation of a switch actuated as the brake or clutch pedal is depressed. This is objectionable however for these reasons. When the vehicle is traveling down grade the operator, not necessarily to decrease speed but to prevent an increase of speed, depresses the pedal whereupon the stop light is energized. In traveling up grade, when there is likely to be a definite decrease of speed and the pedal is not depressed, the tail-light is not energized to give the warning that it should. On the one hand the tail-light indicates a slackening of speed when there may be no decrease while on the other hand where there is likely to be a decrease, there is no stop light signal.

According to this invention, the above and other objections are overcome by the provision of means adapted to insure energizing of the tail-light automatically whenever there is a decrease of speed of the vehicle, regardless of whether the vehicle is traveling up or down grade.

The apparatus may be used for various purposes but it is well adapted for use in connection with a motor vehicle or the like. Various novel advantages and objects of the invention will be observed from the following description of the present preferred form thereof with reference to the accompanying drawing wherein:

Fig. 1 is a longitudinal sectional elevational view through an apparatus embodying the novel features of the invention;

Fig. 2 is an elevational sectional view on the line 2—2 of Fig. 1;

Fig. 3 is a sectional plan view on the line 3—3 of Fig. 1;

Fig. 4 is a diagrammatic view to explain how the apparatus may be associated with a vehicle frame;

Fig. 5 is a wiring diagram to explain the invention; and

Fig. 6 is a small scale diagrammatic sectional view to explain certain novel features of the invention.

Referring now to the drawing in detail, the invention will be more fully described.

A casing or shell 2 is provided which preferably has a peripheral wall 4 and end walls 6. These parts may be secured together in any well-known manner and may be of any material desired. In the form of the invention shown, the shell is of metal but it may be of some plastic material. When of metal the said shell may serve as a conductor for one side of a circuit. A pair of plates 8, one or both of which are secured to a wall or walls 6 of the shell carries a switch device indicated by 10.

This switch device may take various forms but in the form of the invention shown the said switch device is of the type commercially known as a micro-switch and is described in U. S. Letters Patent No. 1,960,020. This switch has an actuating plunger 12 that operates with a snap action through a relatively short distance, between depressed circuit open and an extended outward circuit closing position. In the Fig. 1, the plunger 12 is in a depressed circuit open position. It will move outwardly to a circuit closing position with a snap action when released by a swinging actuator 14 that is pivoted between the plates 8 at 15.

A bracket member 16 is formed to have spaced side arms 18. A shaft 20 the ends of which are journalled in plates 8 is associated with bracket 16. A flange or flanges 22 on the bracket 16 are secured to a weight such as 24. A roll 26 or the like is carried between the arms 18 and acts on the actuator 14 to normally hold the same against plunger 12 maintaining said plunger in open circuit position. A stop 26' is associated with the shell and prevents swinging of the weight 24 counterclockwise beyond a normal open circuit position. A similar stop 28 limits clockwise circuit closing swinging movements of the weight.

The apparatus is preferably mounted on a vehicle frame so that the axis of shaft 20 is disposed horizontally then when the apparatus is moved to the left in the direction of the arrow of Fig. 1, the weight swings to the left or clockwise on a decrease of speed of the vehicle whereupon the plunger 12 is allowed to snap to circuit closing position. Thus as the speed of the vehicle decreases, the switch closes so that a circuit including a stop light is energized and thereby a signal is given which indicates a decrease of speed.

A shaft 30 is journalled in plates 8 which carries a pinion 32 that is in mesh with a segment 34 rigidly associated with bracket 16 whereby shaft 30 is oscillated by oscillation of the bracket 16 and weight 24. A rod 36 extends from a collar 38 fixed on shaft 30 and this rod has a weight 40 on its upper end. This weight 40 may be varied so as to have more or less influence on shaft 30 and through the pinion and segment it has an influence on the movement of weight 24. With the parts shown in Fig. 1, the weight 40 tends to dampen such slight movements of the weight 24 as may be caused by vibration, etc. When, however, the weight 24 is caused to move clockwise by a decrease in speed, the rod 36 is moved counterclockwise so that weight 40 assists weight 24 whereby the latter tends to lie against stop 28. In this position the plunger 12 is in circuit closing position.

The parts described in connection with Fig. 1 are in a normal operating position with the switch plunger in circuit open position. It is desired to maintain the shell and switch mechanism in this normal position at all times so that when the vehicle is tilted as when traveling upgrade or downgrade, the switch will not be operated on the one-hand or prevented from operating on the other merely because the vehicle is on an incline. On the contrary by being maintained in a normal position the switch device will be operated whenever the speed of the vehicle decreases regardless of whether the vehicle is on the level or an incline. This is accomplished by means of the following.

The shell 2 is mounted for oscillation on the axis of shaft 20, and preferably in a closed tank or compartment 44 which has end and side walls 46 and 48, and upper and lower walls 50 and 52. Trunnions 54 on the side walls 6 of the shell 2 are journalled in bearings 56 carried by the side walls 44 of the tank. The tank carries a liquid as indicated which may be oil or the like. A float 58 more or less submerged in the liquid is connected by a rod 60 to the shell 2. This tank 44 may be carried by the frame of a vehicle such as indicated by F, and as the frame and tank are tilted the liquid maintains a level so that the float maintains the shell in a normal position, the tank actually swinging relative to the shell. Thus the shell and switch mechanism are maintained in a normal operative position regardless of the inclination of the tank.

It will be assumed that the tank is mounted on a vehicle which is traveling in the direction of the arrows. As the speed decreases the weight 24 swings to the left whereupon the switch 10 closes the circuit. If the vehicle is tilted as when traveling on an upgrade, as in Fig. 6, the tank is tilted but the switch shell is held in its normal position by means of the float and liquid, whereby the mechanism is operative on a slackening of speed. It will be understood that the shell and parts are sufficiently well balanced to assume a normal operative position whereby the mechanism is easily affected by changes in speed.

To prevent undue swishing of the liquid in the tank such as results from movements of the vehicle, baffles 62 and 64 are provided. To permit passageway of the liquid from one end of the tank to the other a restricted passageway is formed by means of a tube 68.

The liquid may be water or the like, oil and kerosene, or whatever may be desired. Liquids of different characteristics will vary in viscosity and to that end the area of the tube may be varied.

With a liquid the viscosity of which is affected by temperature changes, it is desirable to provide means to control the area of the tube. This is accomplished in one way by a valve 80 which is movable towards and away from the entrance of the tube 68 by means of a member 82 which has an end secured to the tank. The member 82 is preferably of bi-metal so that changes in temperature cause it to flex in one direction or the other whereby the valve moves relative to the tube end.

The switch may be connected to the stop light in many ways as will be apparent to one skilled in the art. In the foregoing description the shell has been referred to as being of metal so that with a metal tank 44 one terminal of the switch may be connected to the shell which may be the ground side of a circuit including a stop or signal light. The other side of the switch may be connected to a lead which is insulated from the shell and tank.

The diagram of Fig. 5 illustrates how one side of the switch 10 is grounded while its other side is connected as by 74 to one side of a stop light 70. The other side of the light is connected by 72 to one side of a battery which is grounded as shown.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A switch apparatus of the class described comprising in combination, a movable switch operating member, a weighted member movable in opposite directions operable to actuate said member and arranged to operate by inertia, and a second weight connected to and operable by said weighted member as it moves in one direction and adapted to assist the same in its movement in one direction.

2. An apparatus for opening and closing a circuit of a vehicle comprising in combination, a tank for securing to said vehicle carrying a liquid, a support oscillatable in said tank, a switch device on said support having a weighted part arranged for movements between circuit closing and circuit opening positions disposed to be operable by a decrease of the speed of the vehicle, a float on said support contacting said liquid whereby the position of the support relative to the tank is influenced by the level of the fluid, a transverse baffle in said tank intermediate its ends, a restricted passageway extending between the ends of the tank for the passage of liquid, and a thermostatically controlled member for increasing or decreasing the area of the passageway.

3. A switch apparatus for vehicles and the like comprising in combination, a switch operating member movable between switch opening and closing positions, a weighted member pivoted for swinging movements between a switch opening position where it engages said operating member and a position away therefrom where the operating member is released, a second weighted member movable between active and inactive positions, and positive connections between said weighted members whereby the second weighted member is moved from inactive position as the first-named weighted member swings from switch opening position so the second weighted member assists the first-named weighted member.

4. An apparatus for opening and closing a circuit of a vehicle accordingly as the speed of the vehicle varies comprising in combination, a tank for a liquid adapted to be secured to a vehicle and tilted accordingly as the vehicle is tilted, a switch mechanism pivoted to said tank for oscillatory movements including a switch opening and closing member and a pivoted weighted member engageable therewith to actuate the same accordingly as said weighted member is caused to swing by variations in the speed of the vehicle, leveling means for said mechanism including a transverse wall in said tank to divide the same into separate compartments, and a float extending from said mechanism for contacting with liquid in one of said compartments.

5. An apparatus for opening and closing a circuit of a vehicle accordingly as the speed of the vehicle varies comprising in combination, a tank for a liquid adapted to be secured to a vehicle and tilted accordingly as the vehicle is tilted, a switch mechanism pivoted to said tank for oscillatory movements including a switch opening and closing member and a pivoted weighted member engageable therewith to actuate the same accordingly as said weighted member is caused to swing by variations in the speed of the vehicle, leveling means for said mechanism including a transverse wall in said tank to divide the same into separate compartments, a restricted passageway connecting said compartments, and a float extending from said mechanism for contacting with liquid in one of said compartments.

6. An apparatus for opening and closing a circuit of a vehicle accordingly as the speed of the vehicle varies comprising in combination, a tank for a liquid adapted to be secured to a vehicle and tilted accordingly as the vehicle is tilted, a switch mechanism pivoted to said tank for oscillatory movements including a switch opening and closing member and a pivoted weighted member engageable therewith to actuate the same accordingly as said weighted member is caused to swing by variations in the speed of the vehicle, leveling means for said mechanism including a transverse wall in said tank to divide the same into separate compartments, a restricted passageway connecting said compartments, a float extending from said mechanism for contacting with liquid in one of said compartments, and a thermostatically operated valve to control the entrance to said passageway.

WALLACE R. LYMAN.